UNITED STATES PATENT OFFICE.

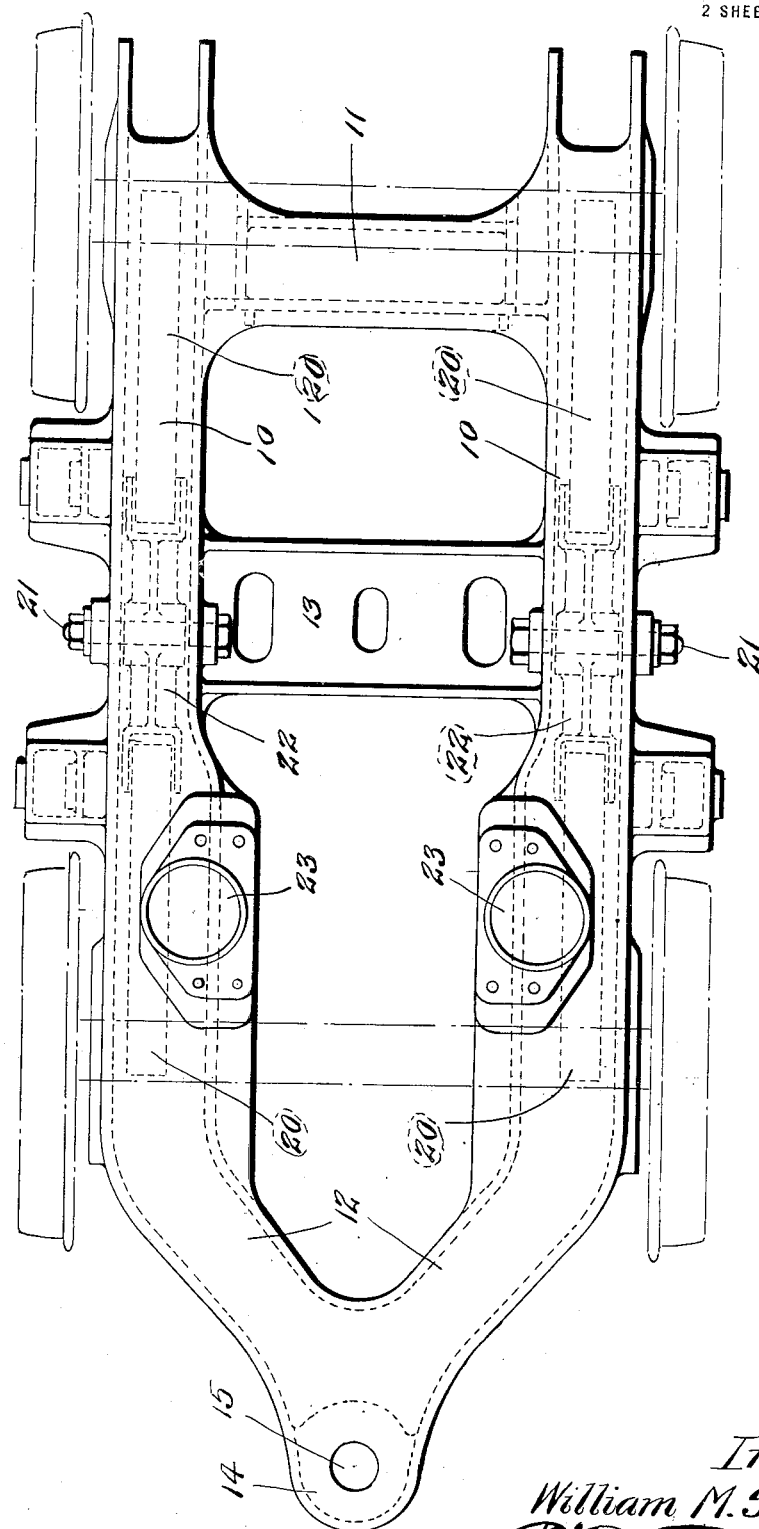

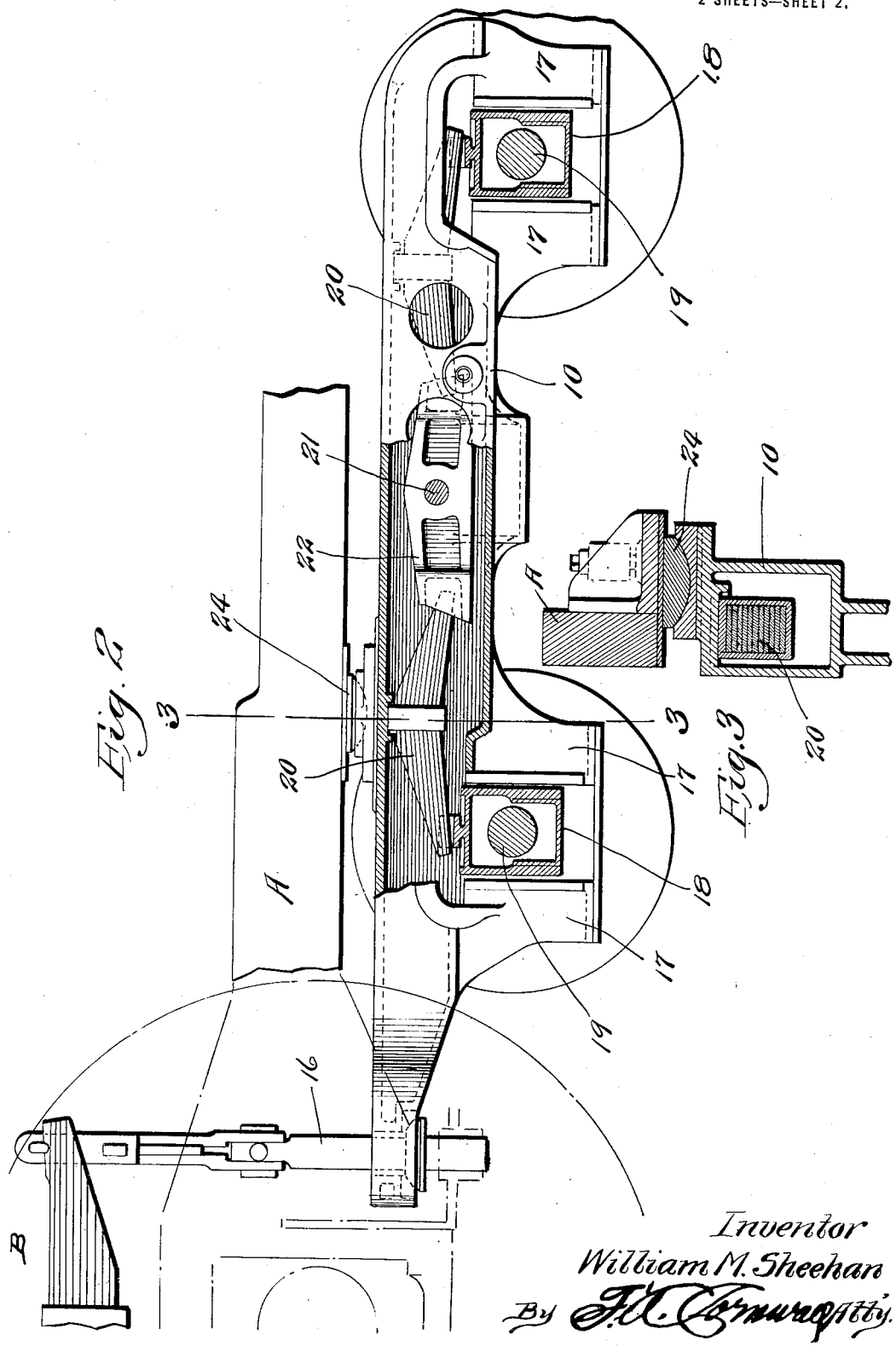

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

FRONT TRUCK FOR LOCOMOTIVES.

1,354,140.  Specification of Letters Patent.  Patented Sept. 28, 1920.

Application filed August 11, 1919. Serial No. 316,805.

*To all whom it may concern:*

Be it known that I, WILLIAM M. SHEEHAN, a citizen of the United States, residing at St. Louis, Missouri, have invented a certain new and useful Improvement in Front Trucks for Locomotives, of which the following is a full, clear, and exact description, such as will enable others skilled in the art to which it appertains to make and use the same, reference being had to the accompanying drawings, forming part of this specification.

My invention relates generally to locomotives and more particularly to a front truck therefor; that is, a truck provided with two or more wheel carrying axles that is adapted to be positioned beneath the front portion of the locomotive, in front of the driving wheels for the purpose of carrying a part of the weight of the locomotive.

The principal objects of my invention are to provide a relatively simple and efficient front truck for locomotives which truck is provided with a plurality of wheel carrying axles and to connect the truck frame to the main frame of the locomotive in order that the truck may have lateral swinging movement and so that the truck frame will constitute one of the parts of the equalizing system of the locomotive.

Further objects of my invention are to provide a front truck for locomotives, wherein the rear portion of the truck frame constitutes a radius bar, whereby the truck may be connected to the locomotive frame for lateral swinging movement; to provide means for applying the supported weight to the truck frame intermediate of the trucks axles, and further to equip the truck frame with an equalizing system that is auxiliary to the main equalizing system of the locomotive, and said auxiliary equalizing system being effective in distributing the greater portion of the weight carried by the trailer truck upon the axles thereof.

Further objects of my invention are to provide a relatively simple trailer truck which will be effective in performing its intended functions; to provide a construction which may be easily and cheaply produced and which combines great strength and rigidity with minimum weight.

With the foregoing and other objects in view, my invention consists in certain details of construction and arrangement of parts hereinafter more fully described and claimed, and illustrated in the accompanying drawings: in which, Figure 1 is a top plan view of a locomotive front truck of my improved construction.

Fig. 2 is a side elevational view of the truck with parts thereof broken away.

Fig. 3 is a vertical section taken approximately on the line 3—3 of Fig. 2.

Referring in detail to the accompanying drawings which illustrate a practical embodiment of my invention, it will be seen that the frame of my improved truck comprises a pair of side members 10 which are disposed substantially parallel with each other and the forward ends of said side members being connected by a transversely disposed transom member 11. The rear end portions 12 of the side members 10 converge and unite at a point on the medial line of the truck.

As illustrated, this truck frame may be formed in a single piece by casting or otherwise, or it may be composed of separately formed parts that are connected to each other by bolts, rivets, or in any other suitable manner. The side members 10 and transom member 11 may be of any desired cross sectional shape, although I prefer to make the side members hollow and substantially box shape in cross section for by so doing I provide housings for equalizing members associated with the truck and which will hereinafter be more fully described.

Arranged a short distance to the rear of transoms 11 and uniting the rear ends of the converging portions 12 of the side members is a transversely disposed plate 13 which serves to strengthen and reinforce the central portion of the truck frame. Formed integral with or fixed to the united rear ends of the converging portions 12 of the side members is a block or housing 14 and formed therethrough is a vertically disposed aperture 15, the latter receiving a vertically disposed king pin 16 or the like, the same being seated in a portion of the main frame A. of the locomotive. This king pin is arranged for vertical movement in its bearing in the main frame of the locomotive and it is suspended by suitable means from the front ends of the front driver springs B. Thus the converging front end portions 12 of the truck frame side members 10 constitute a radius bar whereby the truck is connected to the main frame of the locomotive.

Formed on the side members 10 of the truck frame near the front and rear ends thereof are depending pairs of pedestal jaws 17 between which are positioned, in the usual manner, journal boxes 18 and which latter receive the ends of wheel carrying axles 19. Arranged within each side piece 10 and with their centers bearing against the underside of the top plate of the side piece are semi-elliptic springs 20, the outer ends thereof bearing directly on top of the journal boxes 18. Seated in the side walls of each side member 10 are the ends of a transversely disposed pin or bolt 21, the same being located midway between the springs 20 and mounted for rocking movement upon this pin or bolt is a rigid equalizing member 22, the ends of which are provided with seats or pockets that receive the inner ends of springs 20. These springs and coöperating equalizing member 22 constitute an equalizing system that is auxiliary to the main equalizing system of the locomotive and said auxiliary system being effective in distributing upon the front truck axles the greater portion of the weight supported by said front truck.

Formed on or fixed to the side members 10 and in front of the rear one of the front truck axles are plates 23 which are formed so as to receive friction bearing pads 24, the latter being directly engaged by bearing plates or like parts that are arranged on the underside of the locomotive frame A.

Thus it will be seen that I have produced a locomotive front truck that has a strong and substantial frame and that said frame is connected to the locomotive frame so as to have the required lateral movement beneath the front end of the locomotive.

The weight of the front portion of the locomotive is transmitted to the front truck through bearing plates 23, the latter being located in front of the rear one of the axles of said truck. The greater portion of this weight is carried by the truck itself, but a relatively small portion is transmitted through the rear end of the truck frame and through the means utilized for pivotally connecting the front truck to the locomotive frame and to the main equalizing system of the locomotive, of which latter the front driving springs are a part.

Thus the frame of the front truck constitutes a part of the main equalizing system of the locomotive and likewise said frame constitutes a part of the auxiliary equalizing system which includes the springs 20 and equalizing members 22, the arrangement being such that the greater portion of the weight carried by the front truck is equalized or equally distributed between the front truck axles.

It will be readily understood that minor changes in the size, form and construction of the various parts of my improved front truck for locomotives may be made and substituted for those herein shown and described, without departing from the spirit of my invention, the scope of which is set forth in the appended claims.

I claim:

1. The combination with a locomotive and its equalizing system, of a truck having a plurality of wheel carrying axles, said truck being arranged beneath the front portion of the locomotive and having the rear portion of its frame pivotally connected at its rear end to the equalizing system of the locomotive thereby constituting a radius bar that is adapted to swing laterally beneath the locomotive frame, and bearings on said frame between the axles for the locomotive frame.

2. The combination with a locomotive and its equalizing system, of a truck having a plurality of wheel carrying axles, said truck being arranged beneath the front portion of the locomotive and having the rear portion of its frame pivotally connected at its rear end to the equalizing system of the locomotive, thereby constituting a radius bar that is adapted to swing laterally beneath the locomotive frame, locomotive main frame bearings on the truck frame between the axles carried by said truck frame, and means associated with the truck frame for distributing the weight supported by said truck equally upon its axles.

3. The combination with a locomotive and its equalizing system, of a truck disposed beneath the front end of the locomotive, the rear portion of the frame of said truck being flexibly connected to the equalizing system of the locomotive whereby said truck frame performs the functions of an equalizing member, said truck including a plurality of wheel carrying axles and said truck being adapted to support the locomotive frame at points between said wheel carrying axles.

4. The combination with a locomotive and its equalizing system, of a truck disposed beneath the front end of the locomotive, the rear portion of the frame of said truck being flexibly connected to the equalizing system of the locomotive whereby said truck frame performs the functions of an equalizing member, said truck including a plurality of wheel carrying axles, and bearings formed on the frame of the truck in front of the rear one of the axles thereof which bearings are adapted to receive parts of the locomotive frame.

5. The combination with a locomotive and its equalizing system, of a truck positioned beneath the front portion of the locomotive for supporting a part of the weight thereof, said truck including a plurality of wheel carrying axles, and a frame, the rear portion of which constitutes a radius bar that is connected to the equalizing system of the locomotive and which truck frame is adapted to support the locomotive frame at points between said wheel carrying axles.

6. In a front truck for locomotives, a frame having side members, the rear ends of which are connected to form a radius bar, a plurality of wheel carrying axles journaled in said frame and locomotive frame supporting bearings on the side members of the truck frame between the wheel carrying axles.

7. In a front truck for locomotives a frame having side members, the rear ends of which are connected to form a radius bar, a plurality of wheel carrying axles journaled in said frame, and bearings on said frame in front of the rear one of the axles thereof.

8. In a front truck for locomotives, a frame having side members, the rear ends of which are connected to form a radius bar, a plurality of wheel carrying axles journaled in said frame, and equalizing means associated with said truck frame for distributing the weight supported by the truck frame equally between the axles of the truck.

9. In a truck for locomotives, a frame having side members, the rear ends of which are connected to form a radius bar, a plurality of wheel carrying axles journaled in said frame, bearings on said frame in front of the rear one of the axles thereof, and a plurality of wheel carrying axles journaled in said frame.

10. In a front truck for locomotives, a frame comprising a pair of side members arranged substantially parallel with each other, a pair of wheel carrying axles journaled in said side members, connections between the front portions of said side members, locomotive frame bearings on said side members between said wheel carrying axles, and the rear portions of said side members being extended toward each other and connected to form a radius bar for the truck.

11. In a front truck for locomotives, a frame adapted to be positioned beneath the main frame of the locomotive, said frame being provided at its rear end with an extension that is adapted to be pivotally connected to the equalizing system of the locomotive, a pair of wheel carrying axles journaled in said frame, and said frame being adapted to support the locomotive frame at points between said wheel carrying axles.

12. In a front truck for locomotives, a frame comprising a pair of side members arranged substantially parallel with each other, connection between the front portions of said side members, the rear portion of said side members being extended toward each other and connected to form a radius bar for the truck, a plurality of wheel carrying axles journaled in said truck frame, and means coöperating with the truck frame for distributing the weight supported by the truck equally upon the truck axles.

In testimony whereof I hereunto affix my signature this 6th day of August, 1919.

WILLIAM M. SHEEHAN.